HYDRAULIC MECHANISMS FOR BOATS WITH TILTABLE PROPELLER HOUSING

Original Filed Feb. 6, 1967 4 Sheets-Sheet 1

INVENTOR
KARL ABDON BERGSTEDT
BY George H. Baldwin
ATTORNEY

HYDRAULIC MECHANISMS FOR BOATS WITH TILTABLE PROPELLER HOUSING

Original Filed Feb. 6, 1967 4 Sheets-Sheet 3

INVENTOR
KARL ABDON BERGSTEDT
BY George H. Baldwin
ATTORNEY

HYDRAULIC MECHANISMS FOR BOATS WITH TILTABLE PROPELLER HOUSING

Original Filed Feb. 6, 1967 4 Sheets-Sheet 3

INVENTOR
KARL ABDON BERGSTEDT
BY George H. Baldwin
ATTORNEY

HYDRAULIC MECHANISMS FOR BOATS WITH TILTABLE PROPELLER HOUSING

Original Filed Feb. 6, 1967 4 Sheets-Sheet 4

INVENTOR.
Karl Abdon Bergstedt
BY George H. Baldwin
ATTORNEY

United States Patent Office

Re. 27,633
Reissued May 1, 1973

27,633
HYDRAULIC MECHANISMS FOR BOATS WITH TILTABLE PROPELLER HOUSING

Karl Abdon Bergstedt, Goteborg, Sweden, assignor to AB Penta, Goteborg, Sweden

Original No. 3,548,777, dated Dec. 22, 1970, Ser. No. 868,661, Aug. 27, 1969, which is a continuation of Ser. No. 614,301, Feb. 6, 1967. Application for reissue Dec. 14, 1971, Ser. No. 207,777
Int. Cl. B63h *1/14, 5/06*
U.S. Cl. 115—41 HT 43 Claims

Matter enclosed in heavy brackets [ ] appears in the original patent but forms no part of this reissue specification; matter printed in italics indicates the additions made by reissue.

ABSTRACT OF THE DISCLOSURE

An outboard power leg mechanism including two hydraulic cylinders, valve means connected to the cylinders and a cam for controlling the valve means to retain the outboard leg in a selected desired position of tilt. A cutoff valve is connected to one of the hydraulic cylinders to lock the leg against tilting during reverse propulsion operation and a relief valve is provided to permit the leg to kickup during forward porpulsion when striking an underwater object.

This application is a continuation of application No. 614,301 filed Feb. 6, 1967 and now abandoned.

The invention relates to a hydraulic mechanism for boats with tiltable propeller housing, i.e. boats in which the motor is placed inboard and the drive shaft is connected to a propeller housing pivoted to the stern. Hydraulic devices for tilting the propeller housing have previously been known in various forms. The present invention relates to an elaboration and improvement of such a hydraulic mechanism which is effective to lock the propeller housing or outboard leg against tilting in reverse and which is effective automatically to maintain the leg in an adjustable selected trim position.

The mechanism according to the invention includes a pump driven by the engine, an hydraulic valve assembly coupled through an adjustable linkage to a part of the tiltable propeller housing, and hydraulic cylinders arranged to position the leg.

The invention more particularly comprises a hydraulic mechanism arranged to keep the propeller housing in a predetermined trim position, the position being fixed by cooperation between a cam fixedly attached to the propeller housing and a slide valve capable of being acted upon by the cam.

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings, in which:

Figure 7:
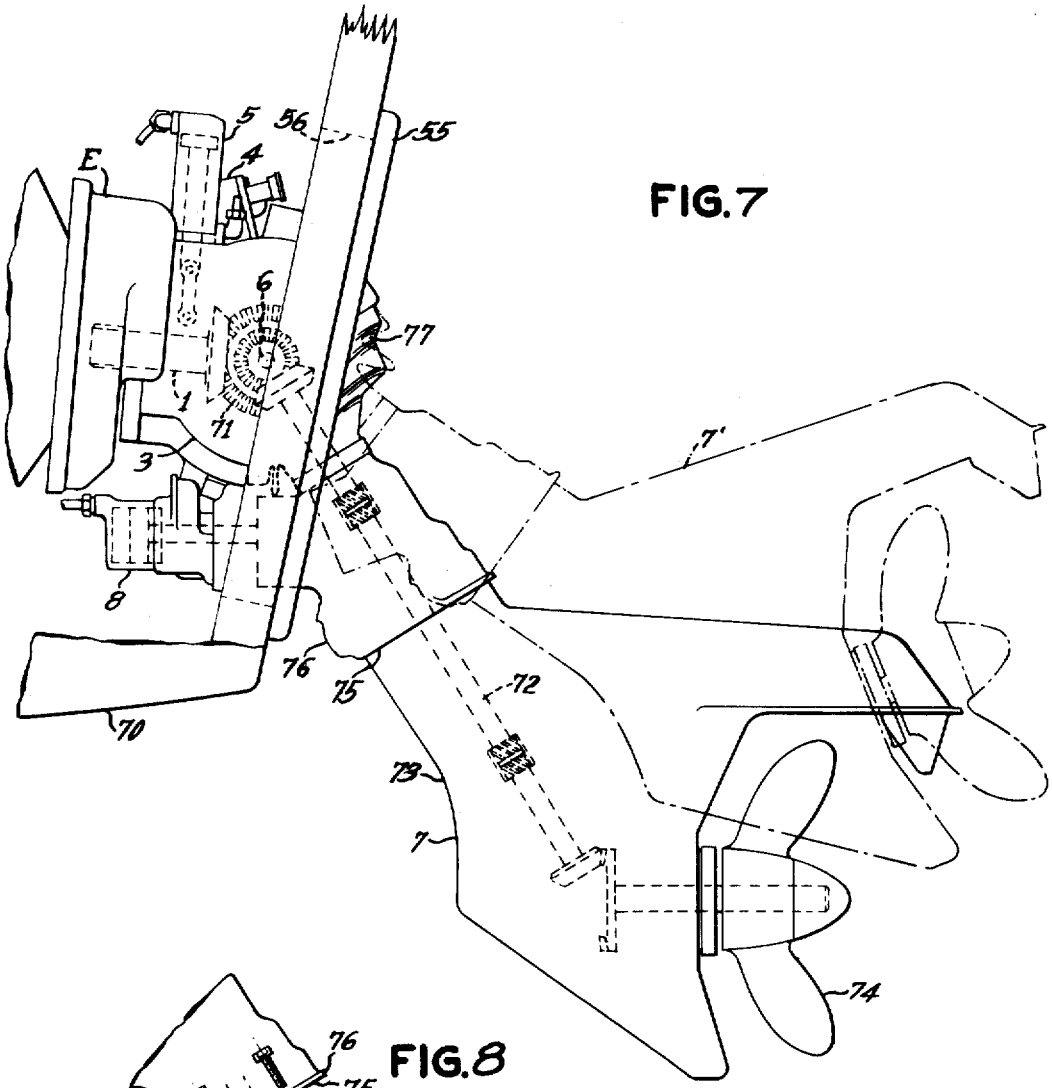
FIG. 7 is a side elevational view of an outboard drive arrangement according to the invention.
Figure 8:
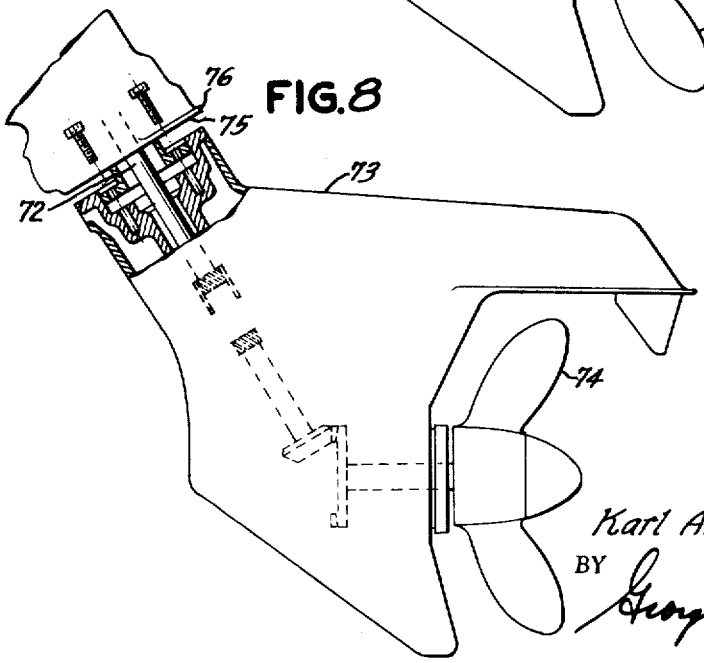
FIG. 8 is a similar view showing the lower portions of the outboard leg partially in section.

The invention is particularly applicable to drive units as shown in FIGS. 7 and 8. The units include an engine E mounted in a boat 70 having a stern transom 56' having an opening 56 therethrough closed by a mounting plate or closure member 55 which is suitably affixed and sealed to the transom.

The outboard leg 7 is mounted to swing or tilt on the axis of horizontal shaft 6, on which are carried gears 71 of a forward and reverse transmission connecting the shaft 1 driven by the engine to the shaft 72 which is housed in and extends along the leg 7. The lower end portion 73 of the leg carries a propeller 74 and is arranged to rotate for steering on the axis of shaft 72, having a rotatable joint at 75 which the upper tiltable portion 76 of the leg. Suitable steering means (not shown) are provided for steering portion 73. Propeller 74 is drivingly connected with shaft 72.

Leg 7 is tiltable from a normal predetermined drive position indicated in solid lines to a tilted position shown at 7' in broken lines. According to important aspects of the invention, the trim of the leg in drive position is adjustablly controlled by a hydraulic expansible chamber device 8 for forward drive and by a second such device for reverse drive. Device 5 may also be operated to power tilt the leg and to forcibly return the leg from tilted to normal trim position.

Flexible bellows 77 seals between the leg 7 and the transmission case 3 whereby fluid may be contained in the case for lubrication and for use in the hydraulic system.

Figure 1:
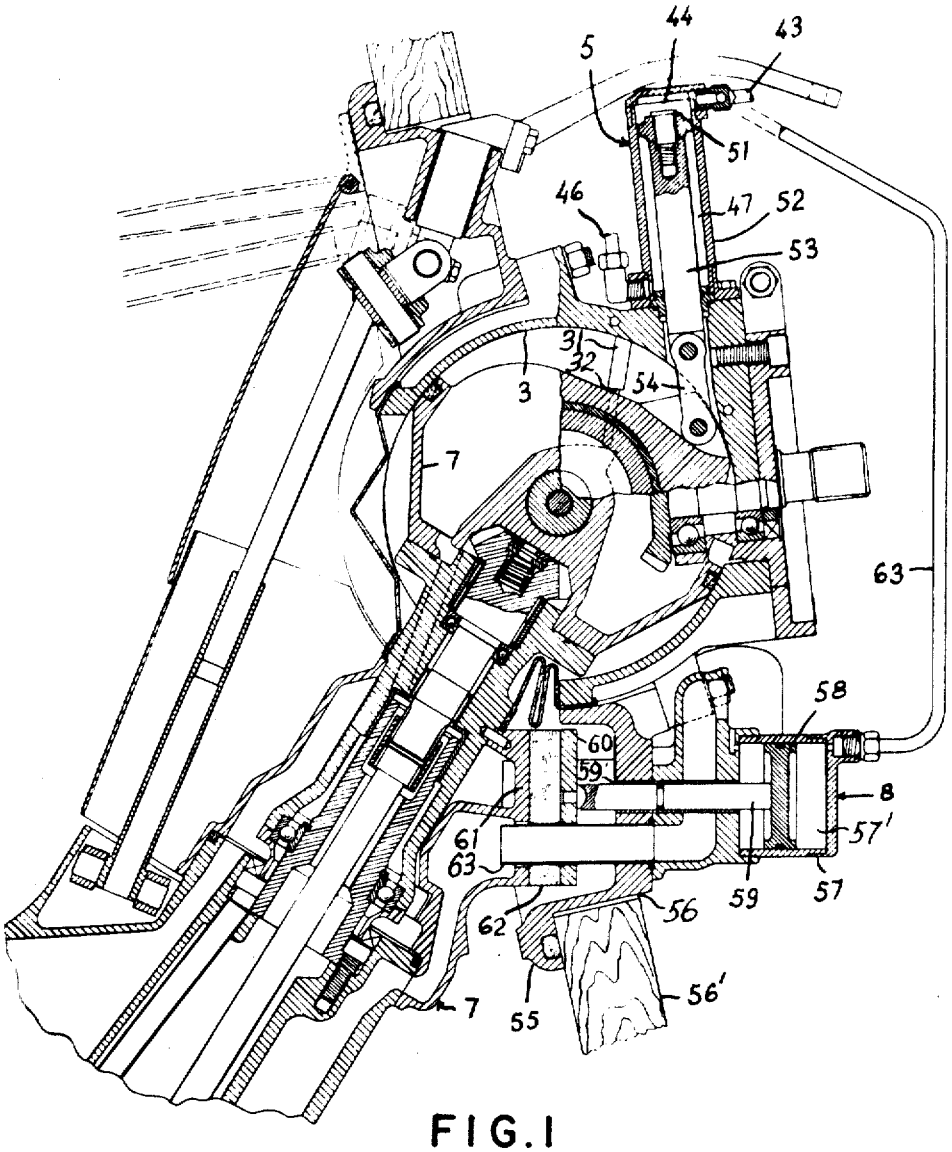
FIG. 1 is a vertical section of a transmission case mounted in the stern of a boat, a tiltable propeller housing or outboard leg, and hydraulic devices for tilting the leg and holding it in trim position.
Figure 4:
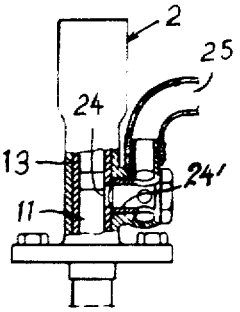
FIG. 4 is a view of a portion of the pump of FIG. 2 in partial section.
Figure 2:
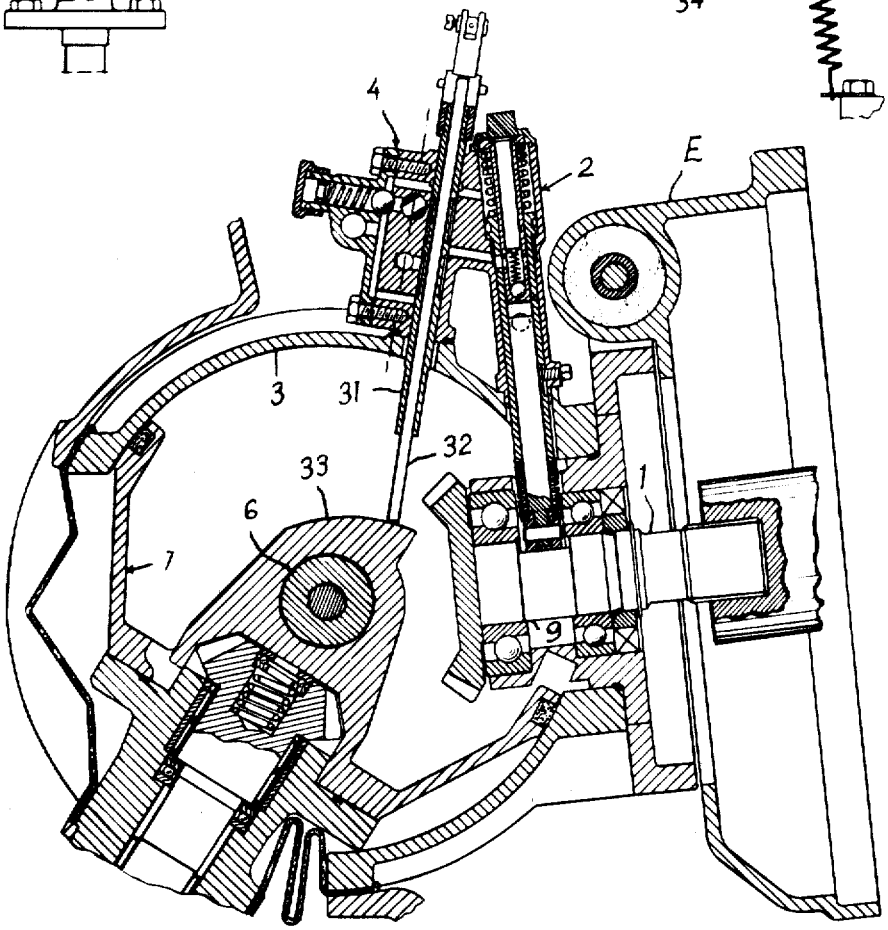
FIG. 2 shows a vertical section, on a larger scale, of the transmission case of FIG. 1 and including mechanism omitted for the sake of clarity from FIG. 1.
Figure 3:
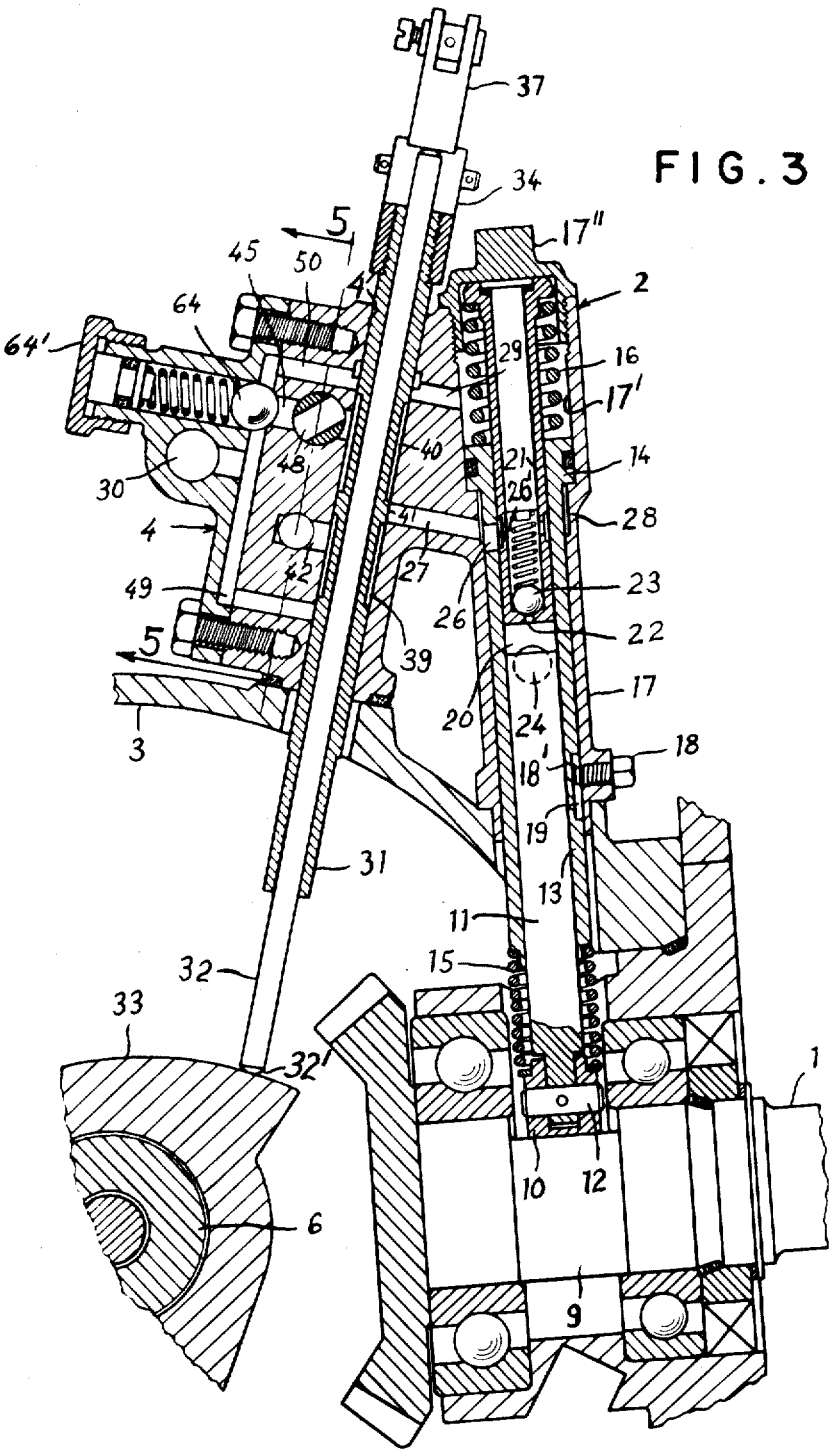
FIG. 3 is a vertical section similar to that of FIG. 2 but on an enlarged scale showing details of the pump and distribution means.

The hydraulic mechanism according to the invention comprises a piston pump 2 seen in FIGS. 2 and 3 coupled to the drive shaft 1 driven from the engine E. The pump draws a liquid medium, for example oil, from a quantity of oil contained in a suitable sump, such as from the interior of the transmission case 3, and delivers the oil under pressure through a distribution valve means 4 to an expansible chamber device in the form of double acting lift cylinder 5 (seen in FIG. 1). The lift cylinder is arranged to swing or tilt the propeller housing or outboard leg 7 on the axis of its mounting shaft 6, which is disposed in the transmission case 3, in a vertical plane. A hydraulic expansible chamber device or piston and cylinder mechanism 8 which further regulates the trim position of the outboard leg 7 is connected in parallel, mechanically, to the lift piston and cylinder mechanism 5.

Piston Pump 2

The drive shaft 1 has an eccentric position 9 on which a shoe 10 rides, the shoe being connected to drive the pump piston 11 through an attaching pin 12. As the drive shaft 1 rotates, upward and downward motion of shoe 10 causes the piston 11 to travel up and down in an inner slidable cylinder 13. The cylinder 13 is formed at its top into a piston 14, which is acted upon downwardly by a coil compression spring 16. The slide cylinder 13 is disposed slidably in an outer cylinder 17, the sliding motion of the cylinder 13 being limited by a stop pin 18 screwed into the cylinder 17 with its tip 18' disposed in a groove 19 on the outside of the slide piston 14. Piston 14 is seen to be disposed in an enlarged upper chamber portion 17' of member 17. The bottom end of the slide cylinder 13 engages a coil compression spring 15, of which the other end engages against the shoe 10 and retains the shoe in contact with the eccentric portion 9 of the drive shaft 1. Above the inner piston 11 inside of cylinder 13 there is a chamber 20, closed at its top by a stationary hollow plug 21 retained in place by an end cap 17'' of the cylinder 17. The plug is provided, however, with a port 22 communicating between the pressure chamber 20 and the interior of the plug, the port being closed by a spring-loaded check valve 23 operative to pass pressure fluid, i.e. oil, from the chamber into the interior of the plug and to prevent flow in the opposite direction. In the wall of the slide cylinder 13 at chamber 20 there is a port 24 arranged to communicate with an opening 24' through the wall of outer cylinder 17 and thence through a suction line 25 with a suitable oil sump, such as the sump in the transmission case 3. From the hollow interior of the plug 21, an outlet opening 26' communicates with a port 26 in the slide cylinder 13 and therethrough with a passage 27 leading to the distributing valve assembly 4. Port 26 and passage 27 also communicate, through a groove or enlarged bore 28 formed in outer cylinder member 17, with the upper chamber portion 17' of member 17 under or below the piston 14.

Operation of Pump 2

When the motor is running and the pump is operating to build up a predetermined operating pressure, the pump piston 11 moves up and down and on the down stroke draws oil from the sump through line 25 opening 24' and port 24 into chamber 20, whence on the up stroke the oil is forced out through check valve 23 and port 26 to passage 27. This action continues while the slide cylinder 13 remains in the position shown in FIG. 3 under the force of the spring 16. In this position of slide cylinder 13 , the port 24 is for the most part below the top edge of the piston 11 when the piston is at bottom dead center as shown in FIG. 2. With the upward stroke of the piston, after the piston has risen through only a small part of its stroke, the port 24 is closed by the piston and the oil or liquid medium is forced out of chamber 20 through the check valve 23. As the back pressure in passage 27 increases, the oil acting through the passage or groove 28 under the piston 14 forces the piston 14, and hence the slide cylinder 13, upward against the action of the spring 16, thereby displacing the port 24 upward in the pump chamber 20 and causing the inlet to be more and more exposed above the piston at its bottom dead center position. With fully developed back pressure, for example when the passage 27 is closed and not required to supply oil to the valve assembly 4, the port 24 will be raised to a height such that the piston 11 fails to close it off even at the extreme top of the piston stroke, and the hydraulic medium is then merely freely pumped in and of opening 24' and tube 25, with the hydraulic medium flowing from the sump to the pump chamber and back again, only a little energy being required to keep the pump running. Passage 27 is closed when valve 4 is in neutral position as later described. As soon as the back pressure has fallen again, such as when valve 4 operates to open passage 27, the slide cylinder 13 drops and the pumping action recommences. Any hydraulic medium that may leak past the piston 14 is discharged through a passage 29 in the cylinder member 17 and through passages in the valve assembly 4 to a return line 30 to the sump. It will be seen, accordingly, that the pump operates to build up a predetermined pressure determined by the force of spring 16 and, of course, by the dimensions of piston 14 and position and size of port 24 and related parts.

Hydraulic Fluid Distribution Means

In a housing connected directly to the pump 2, a sensing and control mechanism 4 is arranged to distribute the hydraulic medium to various points in different operations.

Figure 5:
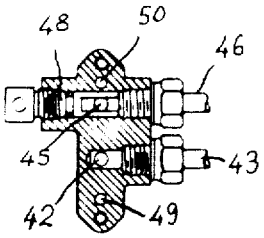
FIG. 5 is a sectional view on a reduced scale taken along the line 5—5 of FIG. 3.
Figure 6:
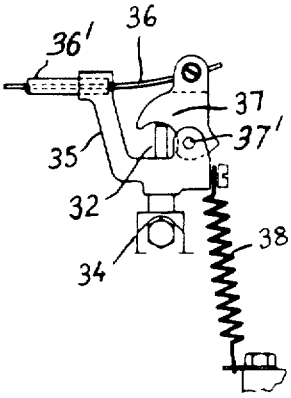
FIG. 6 shows a partial view of a control member for the distribution means.

The housing has a through bore or passage 4' for a slidably movable tubular spool 31, the spool having a pin 32 movable longitudinally relative to the slide extending axially therethrough and projecting from each end thereof. One end 32' of pin 32 rests against and follows a cam 33, which cam is rotatably mounted on shaft 6 in the transmission case 3 and which is fixedly connected to the pivotally mounted outboard leg 7. The pin and cam bus operate to sense the rotative position of leg 7 on its tilt axis. A mounting element 34 is affixed to the top of spool 31. Element 34, as seen in FIGS. 3 and 6, includes an arm 35 which retains the sleeve 36' for a reciprocable coaxial control wire 36, the wire being fixed to a cam member 37 rotatably or swingably mounted on the holder 34 on a pivot pin 37'. The holder 34 is urged downwardly towards the mechanism 4 by a tension spring 38. The upper end of pin 32 engages under the cam 37. The position of pin 32 in spool 31 is controlled by the position of cam 37, which is, in turn, controlled by wire 36. Pulling of wire 36 from a suitable remote control station (not shown) in the boat 70 will rotate cam 37 in a counterclockwise direction as seen in FIG. 6 thereby raising the spool 31 along the pin 32. Following such pulling of wire 36, spool 31 will return to its original position upon rotation of cam 33 in a direction to lower pin 32, thus lowering element 34 and spool 31. The spool 31 seals against the wall 4' in housing 4, but the spool is provided with two lesser diameter groove portions 39 and 40 separated from each other and each forming an annular fluid passage. A land portion 41 between and separating the two grooved portions 39 and 40 is of such a width as just to cover the passage 27 and thus to shut off the pressure outlet from the pump 2 when the valve is in neutral position. In the housing 4, there is also a drilled outlet passage 42, and this communicates on one side with the groove 39 and on the other side with a fluid line or tube 43 as seen in FIG. 5, to an upper chamber portion 44 of cylinder 52 in the lift cylinder assembly 5 as shown in FIG. 1, and to be described below. A pressure passage 45 in valve body 4 communicates with groove 40 and through a tube or line 46 to a lower portion 47 of cylinder 52 in lift cylinder 5. In the passage 45, a shut-off cock 48 is inserted, which in closed position prevents the hydraulic medium from being forced out of lower chamber 47 by sealing off line 46. Return passages 49 and 50 are drilled in housing 4 so that they are alternatively in communication with passages 39 and 40, respectively, and the said passages 49 and 50 are connected to the return line 30 to the sump.

When it is desired to cause the propeller housing to tilt up from the position shown, the wire 36 is manually adjusted so that the cam 37 swings counterclockwise as seen in FIG. 6, whereupon the holder 34 and spool 31 are pulled upwards along the pin 32, while the pin end 32' continues to rest against cam 33. This upward movement of spool 31 opens the connection of passage 27 into passage 39, and the hydraulic pressure medium from the pump flows through line 43 to chamber portion 44 in lift cylinder assembly 5. At the same time, the medium in the chamber portion 47 is free to flow back through line 46, cock 48 and passage 40 out through the now unobstructed return passage 50 to return line or relief conduit 30 to the low or atmospheric pressure sump. If instead the spool 31 is displaced downward on pin 32 by relaxing wire 36, the hydraulic medium is passed through passages 40 and 45 and line 46 to chamber portion 47 in lift cylinder assembly 5, while the medium in the upper end of chamber 44 is free to return through line 43 and passages 42, 39 and 49 and thence through the return line 30 to the sump.

The relative positions of pin 32 and spool 31 establish a predetermined position for leg 7, a position which corresponds to the neutral position of the valve with conduit 27 closed by land 41. Adjustment of cam member 37, accordingly, adjusts the predetermined rotative position of leg 7.

Lift Cylinder Assembly 5

The lift cylinder assembly comprises an expansible chamber device in the form of a piston-cylinder arrangement 5 mounted on the transmission case 3, the piston 51 being movable up and down in the cylinder 52. The piston divides the cylinder 52 into an upper chamber portion 44 and a lower chamber portion 47, to which pressure medium may be supplied as previously described through lines 43 and 46. The arrangement is thus double-acting. The piston 51 is articulated by a piston rod 53 and link 54 to an integral part of the leg 7. When the piston 51 moves downward, the propeller housing 7 will be caused to tilt or pivot upwardly, while supplying hydraulic medium to chamber 47 will cause the propeller housing 7 to swing downward. If the hydraulic liquid is prevented from flowing out of chamber 47 through closing of the cock 48 in line 46, the upward motion of the propeller housing is arrested, as is necessary in reverse operation, when the propeller thrust tends to swing the propeller housing 7 upwardly and rearwardly away from the boat. In forward operation, however, the cock 48 should be open so that if the propeller housing encounters an object under water it can give way and tilt up, thus to prevent damage to submerged parts.

The lift assembly 5 is designed to tilt the propeller housing up out of the water while little or no engine power is being applied to the propeller, such as after landing, and it is not intended to withstand the full propeller thrust in normal forward operation. According to the usual prior art arrangements, outboard legs are trimmed, or held or restrained in drive position by mechanical stop means, usually accompanied by a yieldable mechanical latch. However, readjustment of such mechanical stops may be difficult and trimming cannot normally be carried out during operation, so that the trim position often fails to correspond to actual load conditions in the boat which may vary from time-to-time. According to the present invention, it has been possible to provide a hydraulic, continuously adjustable trim mechanism actuated and controllable from the operating station in the boat while the boat is in motion, rendering the trim and adjustments of the trim angle unusually simple, convenient and accurate.

Trim Mechanism

Inside and connected to a closure and support member 55 mounted to and closing the opening 56 in the stern transom 56' of the boat and carrying the transmission case 3 and propeller housing 7, a trim mechanism 8 is provided. This consists of an expansible chamber device including a hydraulic cylinder 57 with reciprocating piston 58 and piston rod 59, the rod being guided in a bearing 59' in the closure member 55 and extending through it. The end of the piston rod 59 constitutes a stop element and bears against a plate 60, preferably by a ball joint. Opposite the plate 60, the propeller housing 7 is provided with a stop engaging portion 61, and between the plate 60 and the stop engaging portion 61 a stop packing 62, preferably of rubber, is interposed. The stroke of the piston 58 is fairly short but is sufficient to enable the plate 60 to be displaced and hence the propeller housing to be swung as much as substantially corresponds to the trim adjustments required. The chamber 57' in cylinder 57, defined by the working or pressure side of the piston opposite the piston rod 59, is connected to hydraulic line 43 by a line 63. As the area of the piston 58 is several times greater than that of the piston 51 in the lift cylinder assembly 5, the force is much greater than in the lift assembly and is designed to be sufficient to counteract the propeller thrust in full power forward operation. Hence no locking or mechanical stop means for different trim positions are required, and suitable adjustment can be made by setting the cam 37 to automatically regulate the position of piston 58 into the desired trim position. Since the trim mechanism is connected to the chamber 44 in the lift assembly 5, pistons 51 and 58 act simultaneously but, because the stroke of piston 51 is much greater than that of piston 58, as the propeller housing 7 tilts, piston 58 cooperates with piston 51 only during the first part of the tilting motion, whereafter the stop 61 is freed from the packing 62, while packing 62 remains on a pipe 63' which forms a part of a cooling water or exhaust gas system, all as further shown and described in my copending U.S. patent application Ser. No. 597,785, filed Nov. 29, 1966, now U.S. Pat. No. 3,396,693.

SUMMARY

The hydraulic mechanism described above operates as follows.

During forward operation under constant conditions the propeller housing 7 is kept in the adjusted trim position by cam 37 holding pin 32 at a certain point on the cam track 33, at which the spool 31 occupies the neutral position shown in FIG. 3. Land 41 then closes the outlet 27 from pump 2 and the back pressure holds the pump slide cylinder 13 in an upper position so that the pump inlet portion 24 is continuously open, as a result of which the pump idles and no appreciable energy is required to operate it. Chamber 44 and 47 in lift cylinder assembly 5 and the chamber 57 in the trim mechanism 8 are filled with hydraulic medium and the medium in each is prevented by valve spool 31 from returning to the sump. The cock 48 is open. Now if the propeller drive is suddenly cut off or the propeller housing strikes any obstacle, the propeller housing tends to swing up, as must be possible to prevent damage. Hence it must be possible to receive the pressure in chamber 47, and for this purpose an adjustable spring biased ball relief valve 64 is provided in passage 45, so that *at* a certain excess pressure the hydraulic medium will flow out into the relief conduit 30 and return to the sump. The propeller housing 7 is thus held in position with some force, which however will give way under overload. The adjustable cap 64' permits setting of the operating pressure for the relief valve to adjust the force restraining tilting movement of the leg.

The pressure setting for valve 64 should not be so high as to be sufficient to keep the propeller housing 7 from swinging up in reverse, when the entire propeller thrust acts upon it. To prevent tilting of the leg during reverse operation of the propeller, the cock valve 48 is provided. The cock valve is operative to lock the hydraulic medium inside chamber 47 and, when so closed, provides an effective check to tilting up of the leg. The cock 48 will preferably operate jointly with the reversing control linkage for reversing the propeller drive gears 71, thereby to eliminate the risk of having the cock accidentally closed in forward operation. Suitable reverse gearing, which is included in transmission case 3, and other elements of mechanisms of the type to which this invention is directed, are shown in my copending Pat. application Ser. No. 471,683, filed July 13, 1965, now U.S. Pat. No. 3,362,246.

While only a certain preferred embodiment of this invention has been shown and described by way of illustration, many modifications will occur to those skilled in the art and it is, therefore, desired that it be understood that it is intended to cover all such modifications as fall within the true spirit and scope of this invention.

I claim:

1. In a drive mechanism for a boat including an outboard leg mounted for tilting on a generally horizontal lateral axis, a propeller on said leg, means for driving said propeller selectively for forward and reverse propulsion, a hydraulic cylinder and piston assembly, a member fixed with respect to the boat, said leg having a portion movable with respect to said member with tilting of said leg, said assembly being positively connected between said member and said portion and comprising a chamber in said cylinder into and out of which said piston is positively moved upon tilting of said leg to and from its normal drive position, means including a conduit for supplying fluid to and from said chamber, shut-off valve means for closing said conduit and thereby to prevent upward tilting movement of said leg during reverse propulsion, said conduit being provided with a pressure relief valve, said shut-off valve being located to close said conduit between said chamber and said pressure relief valve, and said pressure relief valve being operative to permit upward tilting of said leg upon meeting thereof with an underwater object when said shut-off valve is open.

2. The combination according to claim 1, and a second hydraulic cylinder and piston assembly, respective connecting means connecting one of said cylinder and piston elements to said member and the other of said elements to said portion, one of said connecting means comprising a separable connection, said second assembly having a greater piston area, a shorter effective stroke and applying greater tilting torque to said leg than said first assembly, and means to supply hydraulic pressure fluid into and from a chamber of said second assembly for adjusting the trim of said leg.

3. In a drive mechanism for a boat including an outboard leg mounted for tilting rotationally on a generally horizontal axis, said leg having a portion spaced from said axis, sensing and control means responsive to the rotative position of said leg on said axis, a hydraulic expansible chamber device operatively engaged with said portion operative to rotate said leg on said axis, a source of pressure fluid for operating said device, said means comprising a valve controlling the supply of fluid from said source to said device operative to cut off such fluid when said leg is in a predetermined position and to supply such fluid to said device when said leg is displaced from said predetermined position to return said leg to said predetermined position.

4. The combination according to claim 3 wherein said sensing and control means comprises: a cam on said leg, a follower engaged with said cam, a movable operating member of said valve, and means linking said follower with said movable operating member.

5. The combination according to claim 4 wherein said linking means are selectably adjustable to adjust the predetermined position for said leg.

6. The combination according to claim 3 further comprising a single chamber hydraulic cylinder and piston assembly including a cylinder member and a piston member, means mounting one of said members in fixed position, a stop element carried by the other of said members disposed spacedly from said axis and engageable by said leg in a position to establish a trim position of the leg, and means to connect said chamber to said valve to receive fluid from said source under the control thereof.

7. The combination according to claim 3 further comprising a double chamber hydraulic cylinder and piston assembly and a relief conduit, said assembly including relatively movable piston and cylinder members one of which is connected to said leg spaced from said axis, said valve being double acting and including means for selectively connecting one and the other of the chambers of said cylinder to said source while simultaneously connecting the chamber not so connected to said relief conduit.

8. The combination according to claim 7 wherein said expansible chamber device is single acting in a direction to apply swinging force to said leg only in the direction of increasing tilting of the leg, wherein said device has a limited stroke and said leg is swingable sufficiently to disengage said leg portion from said device, and wherein said sensing and control means is adjustable to adjust said predetermined position.

9. In a drive mechanism for a boat including an outboard leg mounted for tilting on a generally horizontal axis, a hydraulic expansible chamber device connected to said leg offset from said axis for swinging said leg on said axis in response to expansion of said device, a source of hydraulic pressure fluid, means controllingly connecting said source to said device comprising a hydraulic valve including a body member and a valve member, said members being movable with respect to each other to operate the valve, said valve being interposed in the hydraulic connection between said device and said source and controlling the flow of fluid from said source to said device in accord with the relative positions of said members, means retaining one of said members in fixed position, and means connecting the other said member with said leg for movement in response to swinging movement of said leg.

10. The combination in accord with claim 9 wherein said valve is closed when said movable element is in predetermined position to interrupt supply of pressure fluid from said source to said expansible chamber device, said valve is opened upon swinging movement of said leg in a predetermined direction from a position corresponding to such neutral position of said valve element, and wherein said device is oriented to swing said leg in a direction opposite to said determined direction upon the supply of pressure fluid thereto from said source through said valve.

11. The combination according to claim 9 wherein said valve is closed when said movable element is in a predetermined position, said valve includes a relief passage, and said element is movable in respectively opposite directions from its neutral position selectively to open the connection from said expansible chamber device to said fluid pressure source in response to movement from neutral in one of said directions and from said device to said relief passage in response to movement from neutral in the other direction.

12. In a drive mechanism for a boat including an outboard leg mounted for tilting rotationally on a generally horizontally axis, said leg having a portion spaced from said axis, sensing control means responsive to the rotative position of said leg on said axis, power means connected to said portion operative to swing said leg on its said axis, said sensing control means being controllingly connected to said power means and operative to actuate said power means to cause said leg to be returned to a predetermined selected position upon swinging of the leg from such position.

13. The combination according to claim 12 wherein said sensing means is selectably manually adjustable, and such predetermined position for said leg is adjustable in response to adjustment of said sensing means.

14. The combination according to claim 12 wherein said power means is operative to swing said leg in the direction to increase tilt of said leg, said sensing means senses displacements of said leg from its said predetermined position in said direction and in the opposite direction and said sensing means actuates said power means in response to displacement of said leg in said opposite direction from its said predetermined position to return said leg toward its said predetermined position, said power means being normally locked when said leg is in its said predetermined position, and said sensing means being operative to unlock said power means upon sensing displacement of said leg from said predetermined position in said direction of increased tilt.

15. The combination according to claim 12 wherein said power means is operative to swing said leg in the direction to increase tilt of said leg and in the opposite direction, said sensing means senses displacements of said leg from its said predetermined position in each of said directions and said sensing means actuates said power means in response to displacements of said leg in either said direction from its said predetermined position to return said leg toward its said predetermined position, said power means being normally locked when said leg is in its said predetermined position.

16. In a drive mechanism for a boat including an outboard leg mounted for tilting on a generally horizontal axis, means for retaining said leg in predetermined desired trim position on said axis, said means comprising an expansible chamber device including a base portion mounted to the boat and a stop portion engageable with said leg, and portions being movable away from and toward each other, respectively, in accord with the supplying of fluid to and the escape of fluid from said device, a source of pressure fluid, a fluid relief conduit, and valve means responsive to the position of said leg on said axis for selectively supplying pressure fluid from said source to said device and for connecting said device to said conduit to release fluid from said device in accord with swinging of said leg into positons, respectively, of less and greater tilt than said predetermined desired trim position.

17. The combination according to claim 16 further comprising a double acting dual chamber hydraulic cylinder and piston assembly having a stroke greater than the stroke of said expansible chamber device connected to said leg and operative to swing said leg on its said axis between its said trim position and a tilted up position, said valve means being arranged to connect selectively one and the other of the chambers of said cylinder to said source and simultaneously to connect the chamber not so connected to said relief conduit, said valve having a neutral position normally corresponding to the desired trim position of said leg, a coupling between said valve means and said leg through which said valve means senses the leg position, and means for adjusting said coupling thereby to adjust the relationship between the neutral position of said valve and the position of said leg.

18. The combination according to claim 17 wherein said valve means comprises a body mounted in fixed position with respect to said axis, said leg includes a cam portion, said valve means further comprises a valve member movable with respect to said body, and wherein a cam follower element engaged with said cam is operatively connected to said movable member.

19. The combination according to claim 18 wherein the means for adjusting the coupling comprises means for adjusting the connection between said cam follower and said movable valve member.

20. In a drive mechanism for a boat including a normally generally upright leg mounted for tilting with respect to the hull of the boat on a generally horizontal axis near the upper end of the leg and carrying drive thrust means near the lower end of the leg, first means for maintaining the leg in an adjusted normal trim position, second means for tilting the leg upwardly beyond normal trim position, said first means comprising a hydraulic expansible chamber device having two ends movable upon supplying of hydraulic pressure fluid to said device, respective connection means connecting one end of said device to said hull and the other end *to* [of] said leg offset from said axis in a *position* [direction] to urge said leg to pivot on said axis in a direction opposite to the thrust of said thrust means upon such supplying of pressure fluid thereto, the stroke of said device being restricted to a predetermined distance equivalent to angular pivoting of said leg through selectable positions of trim for straight ahead drive of the boat, one of said connection means being separable to permit tilting movement of said leg beyond the maximum trim position as determined by said stroke distance, said second means comprising a second hydraulic expansible chamber device having two ends movable upon supplying of hydraulic pressure fluid thereto, means connecting one of said last mentioned ends to said hull and the other to said leg offset from said axis in a *position* [direction] to urge said leg to pivot on said axis in a direction opposite to the thrust of said thrust means upon such supplying of pressure fluid thereto, the stroke of said second device being sufficient to tilt said leg beyond said maximum trim position, a source of pressure fluid, and means connecting said source to said devices, said last means comprising control valve means interposed between said source and said devices.

21. The combination according to claim 20 wherein said devices are hydraulically interconnected.

22. The combination according to claim 21 wherein the torque applied to said leg upon supplying of pressure fluid to said devices is greater for said first device than for said second device whereby upon opening of said valve means with said leg in a position of minimum trim angle the leg pivots to its maximum trim position and thereafter pivots more rapidly toward its maximum tilt position.

23. The combination according to claim 22 in which said devices are hydraulic cylinder and piston devices and said first device has a shorter stroke and greater piston area than said second device.

24. The combination according to claim 22 wherein said control valve means comprises an automatic valve responsive to the position of said leg on said axis normally operable to maintain said leg in a predetermined trim position and including manual means for adjusting the valve to thereby select such trim position to be so maintained and selectably adjustable to connect said pressure fluid means to supply fluid to said devices after said first device has reached its maximum stroke thereby to tilt said leg therebeyond toward said finally into its said maximum tilt position.

25. In a drive mechanism for a boat including a generally upright leg having water reaction drive means adjacent its lower end, means mounting said leg for tilting with respect to the boat hull on a generally horizontal axis, trimming and tilting means comprising interconnected first and second hydraulic expansible chambers, means to supply hydraulic pressure fluid to said chambers, means mechanically connecting said chambers to said hull and to said leg at respective points offset from said axis, each of said chambers being oriented to exert a tilting force to said leg in a direction opposing said reaction in response to supplying of such pressure fluid thereto, said first chamber having a restricted stroke, said second chamber having a stroke effectively longer than the stroke of said first device, the differential cubic capacity of the pressure chamber of said first chamber for predetermined resultant angular tilt increments of the leg being greater than that of said second chamber, whereby upon supplying of pressure fluid to said chambers when said chambers have minimum volume said first chamber first expands to its stroke limit and said second chamber thereafter expands toward and to the maximum tilt position of said leg.

26. The combination according to claim 25 wherein said pressure fluid supply means includes automatic control means responsive to departure of said leg from a predetermined normal operating trim position and operative in response to such departure to supply fluid to and from said first chamber to return said leg into said position.

27. The combination according to claim 26 further including manually adjustable means for said automatic control means for adjusting said control means to supply pressure fluid to said second chamber when and after said first chamber has reached its maximum stroke thereby to tilt the leg beyond the range of said first chamber.

*28. In an outboard marine propulsion unit adapted to be positioned rearwardly of the transom of the boat to be propelled in a normally downwardly oriented position with the propeller at the lower end of the unit disposed in wetted position below the water line, and being pivotally movable relative to said transom about a generally horizontal axis upwardly through a range of wetted trim positions and thereafter through a range of tilt positions in which the propeller is raised out of the water, the improvement comprising a combined trim and tilt means including motor means connected to said propulsion unit for pivotally moving the latter upwardly about said axis, operative during the movement of said unit through said*

*trim range to move said unit at a relatively slow angular speed and operative during the movement of said unit through said tilt range to move said unit at a relatively fast angular speed.*

*29. In an outboard marine propulsion unit adapted to be positioned rearwardly of the transom of the boat to be propelled in a normally downwardly oriented position with the propeller at the lower end of the unit disposed in wetted position below the water line, and being pivotally movable relative to said transom about a generally horizontal axis upwardly through a range of wetted trim positions and thereafter through a range of tilt positions in which the propeller is raised out of the water, the improvement comprising combined trim and tilt means including motor means operative during the upward movement of said unit through said trim range to apply a pivoting force to said unit having a relatively long moment arm and operative during the upward movement of said unit through said tilt range to apply a pivoting force to said unit having a relatively short moment arm.*

*30. An outboard propulsion system according to claim 29 wherein said motor means includes*

*(A) first motor means operative during said trim range movement and acting through said relatively long moment arm; and*

*(B) second motor means operative during said tilt range movement and acting through said relatively short moment arm.*

*31. In an outboard marine propulsion unit adapted to be positioned rearwardly of the transom of the boat to be propelled and being pivotally movable relative to said transom about a generally horizontal axis between a working position in which the propeller at the lower end of the propulsion unit is disposed below the water line to provide propulsion for the boat and a raised position in which the propeller is raised out of the water, the improvement comprising a trim and tilt mechanism for said propulsion unit including*

*(A) fluid motor means connected to said propulsion unit for pivotally moving the latter about said axis;*

*(B) a source of pressure fluid;*

*(C) means for delivering pressure fluid from said source to said motor means; and*

*(D) means for varying the effective working area of said fluid motor means as said propulsion unit is moved about said axis by said fluid motor means.*

*32. An outboard propulsion unit according to claim 31 wherein*

*(A) said motor means includes first and second fluid motors; and*

*(B) said delivery means includes means for routing pressure fluid to said first motor means during the initial portion of the upward movement of said unit from said working position and routing pressure fluid to [in] said second motor means during the subsequent portion of said upward movement.*

*33. An outboard propulsion unit according to claim 32 wherein*

*(C) said delivery means is operative to route pressure fluid to both of said motor means during said initial movement portion and is operative to route pressure fluid only to said second motor means during said subsequent movement portion.*

*34. An outboard propulsion unit according to claim 32 wherein*

*(C) said first motor means has a relatively large working area and said second motor means has a relatively small working area.*

*35. An outboard propulsion unit according to claim 32 wherein*

*(C) said first motor means acts on said propulsion unit through a relatively long moment arm and said second motor means acts through a relatively short moment arm.*

*36. In an outboard marine propulsion unit adapted to be positioned rearwardly of the transom of the boat to be propelled and being pivotally movable relative to said transom about a generally horizontal axis between a working position in which the propeller at the lower end of the propulsion unit is disposed below the water line to provide propulsion for the boat and a raised position in which the propeller is raised out of the water, the improvement comprising a trim and tilt mechanism for said propulsion unit including*

*(A) a relatively short stroke hydraulic trim cylinder having engagement at one end with said transom or with a member rigid with said transom and having engagement at its other end with said propulsion unit or with a member pivotally movable about said axis with said unit, said trim cylinder having a stroke only long enough to move said propulsion unit from its working position to an intermediate angular position between said working position and said raised postion; and*

*(B) a relatively long stroke hydraulic tilt cylinder having engagement at one end with said transom or with a member rigid with said transom and having engagement at its other end with said propulsion unit or with a member pivotally movable about said axis with said unit, said tilt cylinder having a stroke long enough to pivotally move said propulsion unit from intermediate position to said raised position.*

*37. An outboard propulsion unit according to claim 36 wherein*

*(E) the line of action of said relatively short stroke cylinder with said propulsion unit in said working position is angularly displaced from the line of action of said relatively long stroke cylinder.*

*38. In an outboard marine propulsion unit adapted to be positioned rearwardly of the transom of the boat to be propelled and being pivotally movable relative to said transom about a generally horizontal axis between a working position in which the propeller at the lower end of the propulsion unit is disposed below the water line to provide propulsion for the board and a raised position in which the propeller is raised out of the water, the improvement comprising a trim and tilt mechanism for said propulsion unit including*

*(A) a first hydraulic cylinder having engagement at one end with said transom or with a member rigid with said transom and having engagement at its other end with said propulsion unit or with a member pivotally movable about said axis with said unit;*

*(B) a second hydraulic cylinder having engagement at one end with said transom or with a member rigid with said transom and having engagement at its other end with said propulsion unit or with a member pivotally movable about said axis with said unit, the line of action of said first cylinder with said propulsion unit in said working position being angularly displaced from the line of action of said second cyclinder with said propulsion unit in said working position.*

*39. An outboard propulsion unit according to claim 38 wherein*

*(D) said first cylinder is a relatively short stroke trim cylinder and said second cylinder is a relatively long stroke tilt cylinder.*

*40. An outboard propulsion unit according to claim 39 wherein*

*(E) the line of action of said trim cylinder with said propulsion unit in its working position is closer to the horizontal than the line of action of said tilt cylinder.*

*41. An outboard propulsion unit according to claim 40 wherein*

*(F) the line of action of said trim cylinder with said propulsion unit in its working position is generally horizontal; and*

*(G) the line of action of said tilt cylinder with said propulsion unit in its working position is generally vertical.*

*42. In an outboard marine propulsion unit adapted to be positioned rearwardly of the transom of the boat to be propelled and being pivotally movable relative to said transom about a generally horizontal axis between a small angular range of working positions in which the propeller at the lower end of the propulsion unit is disposed below the water line to provide propulsion for the boat and a raised position in which the propeller is raised out of the water, the improvement comprising a trim and tilt mechanism for said propulsion unit including*

*(A) a relatively short stroke hydraulic trim cylinder connected at one end to said transom or to a member rigid with said transom and bearing at its other end against a surface on said propulsion unit or on a member pivotally movable about said axis with said unit, said trim cylinder having a stroke only long enough to move said propulsion unit within said small angular range of working positions and having a line of action generally opposing the line of action of the thrust force generated by said propeller so as to enable the cylinder to effectively overcome the propeller thrust when thus trimming the propulsion unit; and*

*(B) a relatively long stroke hydraulic tilt cylinder connected at one end to said transom or to a member rigid with said transom and connected at its other end to said propulsion unit or with a member pivotally movable about said axis with said unit, the connection of said tilt cylinder to said propulsion unit being located closer to said pivot axis than the point of bearing engagement of said trim cylinder with said propulsion unit so as to maximize the tilting action of said tilt cylinder and enable it to move said propulsion unit all the way to its raised position.*

*43. An outboard marine propulsion unit according to claim 42 and further including*

*(C) a source of pressure fluid; and*

*(D) means for routing pressure fluid simultaneously to said trim and tilt cylinders from said pressure fluid source to effect conjoint extension of said cylinders during the initial portion of the upward pivotal movement of said propulsion unit and thereafter, after said trim cylinder has reached the end of its stroke, to effect further extension of said tilt cylinder to move said propulsion unit surface away from said trim cylinder other end and move said propulsion unit to its raised position.*

References Cited

The following references, cited by the Examiner, are of record in the patented file of this patent or the original patent.

UNITED STATES PATENTS

| | | | |
|---|---|---|---|
| 3,285,221 | 9/1964 | North | 115—41 |
| 3,406,652 | 10/1968 | Mett, Jr. et. al. | 115—41 |

MILTON BUCHLER, Primary Examiner

C. A. RUTLEDGE, Assistant Examiner